July 24, 1962  R. J. KUTZLER  3,045,492

PRESSURE RATIO MEASUREMENT MEANS

Filed Aug. 3, 1955

*INVENTOR.*
ROBERT J. KUTZLER
BY
*Joseph E Ryan*
*ATTORNEY*

United States Patent Office 3,045,492
Patented July 24, 1962

3,045,492
PRESSURE RATIO MEASUREMENT MEANS
Robert J. Kutzler, Minneapolis, Minn., assignor to Minneapolis-Honeywell Regulator Company, Minneapolis, Minn., a corporation of Delaware
Filed Aug. 3, 1955, Ser. No. 526,189
2 Claims. (Cl. 73—407)

The present invention is concerned with apparatus for indicating the ratio of various parameters, in particular, for indicating the ratio of various pressures in a gas turbine, the ratio of these pressures being indicative of the engine operation.

In our modern gas turbine engine aircraft several engine parameters are used to provide adequate control of the engine through associated control apparatus. As the ratio between certain engine parameters is necessary for this control there is a need for a simple and reliable electric apparatus for continually indicating or controlling from their ratio. Two of such parameters are the inlet total pressure and the turbine exhaust total pressure of the engine, the ratio of these pressures, properly compensated for changes in the atmospheric pressure, is a method of indicating the operation of the engine.

The present invention is concerned with apparatus for providing a first voltage indicative of at least one parameter and a second voltage indicative of at least another parameter. These voltages are applied to an impedance means having an impedance divider. The output obtained from a connection between voltage sources and the impedance divider is fed into a motor control circuit for positioning the impedance divider to rebalance the circuit and also drive an associated indicator or control apparatus.

It is therefore an object of the present invention to provide an improved ratio indicating device for indicating the ratio of at least two conditions.

Another object of the present invention is to provide an improved electrical control apparatus for indicating the pressure ratio of at least two pressures indicative of gas turbine combustion engine operation.

These and other objects will become apparent upon a study of the following specification and drawing of which—

Figure 1:
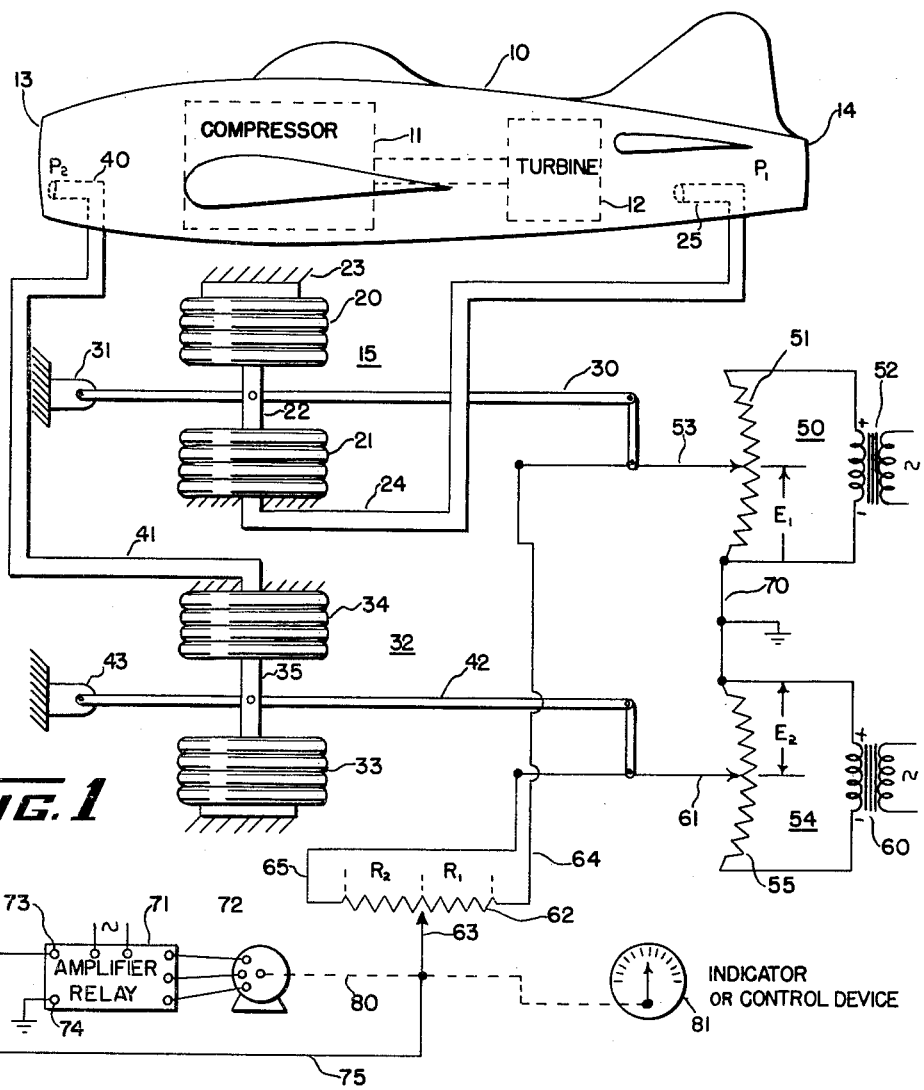
Figure 2:
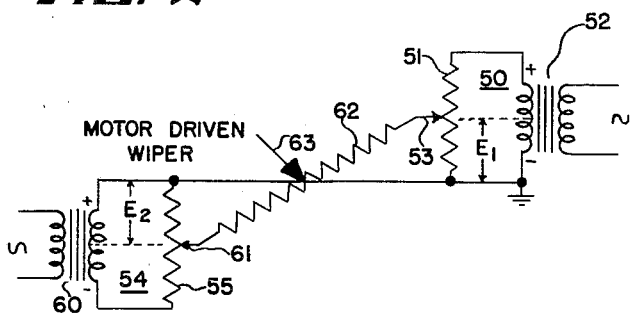

FIGURE 1 is a schematic drawing of the apparatus as applied to a gas turbine combustion engine for indicating the ratio between the total inlet ram pressure and the turbine exhaust pressure; and FIGURE 2 is a condensed circuit for illustrating the electrical rebalancing operation of the indicating apparatus.

Referring to FIGURE 1, the ratio indicating apparatus is applied to the ratio between the inlet total ram pressure and turbine exhaust total pressure of a gas turbine engine. A schematic view of an aircraft 10 is shown having a compressor 11 and a turbine 12. Air enters the inlet 13 of the aircraft and passes through the compressor and turbine to exhaust from outlet 14.

A first pressure responsive device 15 has a pair of bellows 20 and 21 connected in opposition by a link 22. Bellows 20 is evacuated and rigidly mounted at one end to the aircraft frame 23 so that changes in the atmospheric pressure compensates the resultant output obtained from link 22. Bellows 21 is connected by a pipe 24 to a suitable probe 25 responsive to the ram pressure $P_1$ of the gases exhausting from the turbine 12. Such a pressure is normally obtained by a tube whose open end is directed into the air stream from the turbine; however, the details of such are not shown in this application. A link 30 pivoted at one end on a stationary pivot 31 is connected to link 22 to provide for motion indicative of total ram pressure as sensed by probe 25.

A second pressure responsive device 32 similar to device 15 also has an evacuated bellows 33 and a bellows 34 connected in opposition by a link 35. Bellows 34 is connected to a second probe 40 by a pipe 41. Probe 40 is directed into the inlet air stream and senses the total inlet air pressure $P_2$ to compressor 11. A member 42 pivotally mounted at one extremity at a fixed pivot 43 is connected to link 35 so that movement of member 42 is indicative of the total ram air pressure to the inlet of the craft.

While pressure responsive devices 15 and 32 have been described in some detail it is obvious that there are other modifications of such pressure responsive devices by which movement of members 30 and 42 can be obtained indicative of the total air pressure of the turbine discharge and the compressor inlet, respectively. It should also be obvious that the use of the evacuated bellows 20 and 33 is necessary only where the atmospheric pressure changes are of some consequence as they are in aircraft control devices where an extreme change in altitude of the craft takes place rapidly.

A variable source of voltage 50 comprises a resistor 51 connected across the secondary of a source of power 52. Resistor 51 has a movable wiper 53 thereon positioned by member 30 so that the voltage obtained between the lower extremity of resistor 51 and wiper 53 (shown as $E_1$) is proportional to the total pressure of the turbine exhaust ($P_1$).

A second variable voltage source 54 comprises a resistor 55 connected across a secondary of a source of power 60. Resistor 55 has a movable wiper 61 positioned thereon by member 42 so that the voltage obtained between the upper extremity of resistor 55 and wiper 61 (shown as $E_2$) is proportional to the output of device 32, that is the total inlet air pressure ($P_2$) of the compressor. A resistor 62 has a movable wiper 63 thereon. The right extremity of resistor 62 is connected by a conductor 64 to movable wiper 53 and the left extremity of resistor 62 is connected by a conductor 65 to movable wiper 61. Upon connecting the lower extremity of resistor 51 and the upper extremity of resistor 55 by a grounded conductor 70 a circuit is obtained in which the sum of the voltages from sources 50 and 54 are applied across resistor 62. When the wiper 63 is positioned so that the resistance of resistor 62 to the right of the wiper (designated as $R_1$) and the resistance to the left of wiper 63 (designated as $R_2$) are proportional to the voltages $E_1$ and $E_2$, respectively, no voltage exists between wiper 63 and ground.

An amplifier relay 71 of the sort disclosed in the A. P. Upton Patent No. 2,423,534 issued July 8, 1947, has a reversible motor 72 connected thereto. Upon the application of a signal of one phase or the other to input terminal 73 motor 72 runs in one direction or the other. A second input terminal 74 is grounded. The output of the electrical circuit obtained at movable wiper 63 is connected to the input of the input terminal 73 by a conductor 75. The motor 72 is connected through a mechanical connection 80 to wiper 63 as well as an appropriate indicator or control device 81. The electrical circuit thus is of a rebalance type so that upon a change in the position of wipers 53 and 61 the output voltages of sources 50 and 54 are changed and the indicator is repositioned. A signal is obtained between wiper 63 and ground of a predetermined magnitude of one phase or the other to render motor 72 operative in a direction to re-establish balance by repositioning wiper 63 along resistor 62 to a null position.

The operation of the invention is to continually indicate the balance or null position of wiper 63 which is indicative of the ratio of the resistance on each side of the wiper shown as $R_1$ and $R_2$. As heretofore mentioned the voltage $E_1$ and $E_2$ are proportional to the pressures $P_1$ and $P_2$, respectively, and to have a balance of the electrical system the voltages $E_1$ and $E_2$ must be proportional to the resistance on each side of wiper 63, that is $R_1$ and $R_2$. Thus an equation can be written as follows:

$$(K)P_1/P_2 = E_1/E_2 = R_1/R_2$$

where K is a constant. Referring to FIGURE 2, the electrical circuit is shown. As the resistors 51, 55 and 62 are linear resistors, schematically the triangles formed by the upper portion of resistor 55 and resistor 62 and the triangle formed by the lower portion of resistor 51 and resistor 62 are similar triangles. Voltages $E_1$ and $E_2$ are proportional to the portion of their respective resistors 51 and 55 between the grounded extremity and movable wipers 53 and 61. It is seen that in order to have a balance or null in the electrical circuit the position of the movable wiper 63 must be on resistor 62 at a point to coincide with the grounded conductor or horizontal line forming one side of the triangle. Let us assume that the movable wiper was to the right of the position shown on resistor 62, that is above the horizontal grounded line shown in FIGURE 2. With the polarities shown on the sources of power 52 and 60 for a particular half cycle of the A.C. voltage supply, a positive output is obtained at wiper 63 to drive motor 72 in a direction to move the wiper to the left to balance the electrical circuit. A continuous rebalance of the electrical circuit is thus provided by movement of wiper 63 across resistor 62 and the position of the wiper is calibrated in terms of the ratio of the resistance on each side of the wiper with an associated scale on indicator 81. As the ratio of the resistance $R_1$ and $R_2$ is proportional to the ratio of the pressures $P_1$ and $P_2$, a continuous indication of the pressure ratio of the pressures in the craft is provided. As shown with the resistances $R_1$ and $R_2$ approximately equal, the ratio of the pressures $P_1$ and $P_2$ is unity.

While one specific embodiment of the present invention is shown, it is obvious that there are other modifications that would be apparent to one skilled in the art thus it is intended that the invention only be limited by the scope of the appended claims.

I claim:

1. In indicating apparatus for indicating the ratio of at least two operating pressures, means responsive to a first pressure, a first variable voltage source having a first sense, means connecting said means responsive to the first pressure to adjust said variable voltage source to obtain a voltage proportional to the first pressure, second means responsive to a second pressure, a second variable voltage source having a sense opposite to the first sense, further means connecting said means responsive to the second pressure to adjust said second variable voltage source to obtain a voltage proportional to the second pressure, a resistor having a single movable wiper thereon, connection means connecting said first and second variable voltage sources and said resistor in a series circuit so that the sum of the voltages obtained from said sources is applied across said resistor, amplifier relay means having an input and output circuit, connection means connecting a tap between said voltage sources and said movable wiper to said input circuit, motor means, indicator means, mechanical connection means connecting said motor means to said movable wiper and said indicator means, and further connection means connecting said motor means to said output circuit so that said motor means adjusts said wiper to a null position indicative of the ratio of said first and second pressures.

2. Apparatus for determining the ratio between two conditions comprising, in combination: a first source of voltage having a terminal connected to a point of reference potential and having an output of a first sense and of magnitude indicative of the first of the conditions; a second source of voltage having a terminal connected to the point of reference potential and having an output of a sense opposite the first sense and of magnitude indicative of the second of the conditions; impedance means having first and second end portions and a single output member movable between the first and second end portions; means connecting said first and second sources of voltage to said impedance means so that the sum of the voltages of said first and second sources of voltage appears between the first and second end terminals of said impedance means; voltage responsive means having a first and second input terminal and an output movable in accordance with the magnitude and sense of the voltage between the first and second input terminals; means connecting the first input terminal of said voltage responsive means to the movable member of said impedance means; means connecting the second input terminal of said voltage responsive means to the point of reference potential; and means connecting the output of said voltage responsive means in controlling relation to the movable member of said impedance means to reduce the voltage between the first and second input means to substantially zero, the position of said movable member then being indicative of the ratio between the first and second conditions.

References Cited in the file of this patent

UNITED STATES PATENTS

| | | |
|---|---|---|
| 2,387,795 | Isserstedt | Oct. 30, 1945 |
| 2,574,656 | Peterson | Nov. 13, 1951 |
| 2,596,030 | Judkins | May 6, 1952 |
| 2,617,586 | Gray | Nov. 11, 1952 |
| 2,671,620 | Andrews | Mar. 9, 1954 |
| 2,677,963 | Mullins et al. | May 11, 1954 |
| 2,693,081 | Russ | Nov. 2, 1954 |
| 2,728,833 | Dickey | Dec. 27, 1955 |
| 2,740,295 | Perchonok | Apr. 3, 1956 |
| 2,751,786 | Coulbourn et al. | June 26, 1956 |
| 2,830,453 | Jones | Apr. 15, 1958 |
| 2,869,367 | Moore | Jan. 20, 1959 |